United States Patent [19]

Deprez et al.

[11] Patent Number: 5,350,613
[45] Date of Patent: Sep. 27, 1994

[54] SAFETY WINDOWPANES MADE OF LAMINATED GLASS; PROCESSES FOR THEIR MANUFACTURE

[75] Inventors: Jean-Pierre Deprez, Meyzieu; Christian de la Rochefoucauld, Lyons, both of France

[73] Assignee: Vertal Nord Est, France

[21] Appl. No.: 36,030

[22] Filed: Mar. 23, 1993

[30] Foreign Application Priority Data

Mar. 26, 1992 [FR] France ................ 92 03663

[51] Int. Cl.⁵ .............................. B32B 17/10
[52] U.S. Cl. ............................ 428/43; 428/68;
428/137; 428/138; 428/201; 428/212; 428/217;
428/410; 428/426; 428/430; 428/437; 428/442;
428/38; 296/84.1; 52/171.3
[58] Field of Search .............. 428/43, 201, 68, 76,
428/426, 430, 437, 38, 131, 137, 138, 212, 217,
410, 442; 296/84.1, 146 R; 52/171

[56] References Cited

U.S. PATENT DOCUMENTS

| | | | |
|---|---|---|---|
| 3,505,160 | 4/1970 | Michaels et al. | 428/81 |
| 3,881,043 | 4/1975 | Rieser et al. | 161/147 |
| 5,064,708 | 11/1991 | Azulay | 296/84.1 |

FOREIGN PATENT DOCUMENTS 9211137 7/1992 PCT Int'l Appl. .

*Primary Examiner*—Ellis P. Robinson
*Assistant Examiner*—Nasser Ahmad
*Attorney, Agent, or Firm*—Larson and Taylor

[57] ABSTRACT

A safety windowpane and process of manufacture made of laminated glass. The windowpane includes two glasses made of annealed, hardened or quenched glass 1, 2 bonded to one another by an insert sheet of synthetic material 3 to the opposite faces of which the glasses are adhesively attached. The sheet includes in the material a line 4 of discontinuity in mechanical strength of relatively small width. The line defines an outline of preopening of a surface area such that after breaking of the glasses 1, 2 and rupture along the outline, it offers a sufficient passage for a human body.

10 Claims, 1 Drawing Sheet

SAFETY WINDOWPANES MADE OF LAMINATED GLASS; PROCESSES FOR THEIR MANUFACTURE

FIELD OF THE INVENTION

The present invention relates to safety windowpanes made of laminated glass and to processes for their manufacture.

It can relate in particular to safety windowpanes for railroad cars.

PRIOR ART

It is known that in vehicles intended for the transportation of travellers use is made more and more often of windowpanes made of laminated glass, that is to say of the type comprising two glasses made of annealed, hardened or quenched glass which are bonded to each other by an insert sheet of synthetic material to the opposite faces of which said glasses are adhesively attached. In the event of impact, these windowpanes resist much better than windowpanes made of nonlaminated quenched glass because, after shattering, the pieces of glass retain their cohesion by virtue of the insert sheet adhesively attached between the two glasses. This prevents the glass fragments from being thrown onto the travellers, with the risk of causing them serious injuries.

However, this undoubted progress brought about by laminated glass entails a corresponding disadvantage: in the event of accident or fire it must be possible for the travellers to be evacuated very rapidly and they must therefore have the possibility of escaping very quickly through the openings, above all if the doors are blocked. The laminated glass in these openings then presents an obstacle to this rapid evacuation, precisely because of its high impact strength, and this is so even when both glasses of the windowpane have been shattered; it has been found that more than a minute is generally required, with the aid of a weight or the like, to break such a windowpane and to produce a sufficient space therein for a person to pass through.

The aim of the invention is to solve this problem.

SUMMARY OF THE INVENTION

To this end, a safety windowpane made of laminated glass of the type referred to at the beginning is, in accordance with the present invention, one in which said sheet comprises in said material a line of discontinuity in mechanical strength of relatively small width, this line defining an outline of preopening of a surface area such that after breaking of the said glasses and rupture along the said outline, it offers a sufficient passage for a human body.

It is understood that this line of discontinuity in the sheet of synthetic material locally suppresses the cohesion of the pieces of glass in both glasses after their fragmenting, and this makes it possible rapidly to produce in the windowpane, with the aid of the usual emergency tool, an opening of sufficient width to pull out the travellers, an opening defined by the above-mentioned "outline of preopening".

It may happen, of course, that the windowpane is not damaged in any way as a result of the accident which entails the need to evacuate the travellers rapidly. In this case they will have to break the two glasses completely. To make this operation easier for them, provision is made for said insert sheet additionally to comprise at least one punctual region of discontinuity in mechanical strength in said material, designated as region of impact for a weight or similar emergency tool, capable of facilitating the breaking of one of said glasses through the other glass.

After breaking of the first glass, for example of the inner glass, by a traveller (or of the outer glass by a rescuer) it will be easy, with the aid of the weight or the like, to break the other glass by striking said punctual region which, for this purpose, will need to have a much lower impact strength than that of the synthetic material forming said insert sheet. The breakage of both glasses having thus been obtained (their cohesion continuing to exist, however), other strikes of a weight within the outline of preopening defined above will quickly make it possible to produce in the windowpane, after rupture along said line of discontinuity, a passage which is sufficient for evacuation of the travellers.

It has been found that a safety windowpane of such constitution could be opened in this way in approximately 30 seconds, and this represents a considerable progress over previously known windowpanes.

From the above it therefore follows that a further feature of a windowpane in accordance with the invention is that said line and/or region of discontinuity in said insert sheet have a strength which is appreciably lower than that of said synthetic material of which this sheet consists.

The line of discontinuity in the synthetic material of the insert sheet may have any outline, for example circular, oval and the like. It may also extend only along the three sides of a rectangle because the fourth (imaginary) side of this rectangle will then be sufficiently embrittled, automatically forming a line of rupture when an impact is applied within the outline of preopening.

According to an embodiment, said line of discontinuity in the synthetic material is an interrupted line, namely a line consisting of consecutive regions in which said synthetic material of which said sheet consists is alternately present and absent.

This can be implemented especially in a windowpane of the type in which said insert sheet of synthetic material is produced by casting and polymerization in situ between said glasses. This windowpane may then be one in which said line of discontinuity is formed by virtue of sections of tape, adhesive on both its faces, of a thickness which is appreciably equal to that of said sheet. When the synthetic material is cast between the two glasses, it will in this way be provided with passages enabling it to occupy all the intermediate space between these sections of adhesive tape, consequently avoiding air bubbles. The great advantage of this embodiment also lies in the fact that the sections of adhesive tape will firmly maintain a spacing of constant thickness between both glasses, this space being then only very slightly distorted by hydrostatic pressure when the synthetic material is cast between the two glasses. Both glasses will thus remain perfectly parallel to one another, which is a requirement from the viewpoint of optics.

Preferably, and in a manner which is known per se, said synthetic material of which the sheet consists is a transparent synthetic resin of the acrylic or similar monomer kind, capable of being polymerized by the ultraviolet, such a resin of high mechanical strength at the same time forming an excellent soundproofing. As for the abovementioned adhesive tape, this will advantageously consist of a polyethylene or similar foam covered on both its faces with an adhesive layer of very high adhesiveness. The fact of employing a foam here will make it possible to limit the separating forces at the interface between the glasses and the sections of adhesive tape when the synthetic material is being cast between the glasses, since the foam will be capable of expanding slightly under the effect of hydrostatic pressure which tends to move both glasses slightly away from each other.

The invention can also be implemented with another type of windowpane, namely with a windowpane of the type in which said insert sheet of synthetic material consists of a double-faced adhesive laminated between said glasses.

This windowpane can then be one in which said line of discontinuity in said material consists of a line of cut made in said sheet, along said desired outline of preopening. Here too, as a result, there will be a localized absence of synthetic material in the insert sheet, it being possible for the abovementioned line of discontinuity to be a continuous line in this case, that is to say a line, still of relatively small width, along which the absence of synthetic material imparts a discontinuity in mechanical strength to the insert sheet (as in the preceding case with adhesive tape).

In this embodiment, and here, too, in a manner known per se, provision is advantageously made for said synthetic material to consist of a polyvinylbutyral (PVB) or similar.

As for the punctual region of discontinuity, this can in all cases, and similarly, be devoid of any material or occupied by a tablet of material of low strength.

The invention further relates to processes for manufacture of the windowpanes which have just been defined.

In the case of windowpanes with insert sheet which is cast and polymerized in situ, the process may be one in which sections of tape, adhesive on both its faces, are adhesively bonded to one of said glasses along said desired outline of preopening, the other glass is applied opposite the preceding one by being pressed against said sections of tape, said synthetic material is cast in the space thus provided by said sections of tape between said glasses, after sealing has been ensured on the edges other than those defining the opening for introducing said material, and said material thus cast between the two glasses is finally polymerized in situ.

In the case of windowpanes with insert sheet which is laminated between the two glasses, the process may be one in which a sheet of synthetic material forming a double-faced adhesive is adhesively bonded onto one of said glasses, a line of cut is made in this sheet along said desired outline of preopening in order to withdraw a certain width of said material, and the other glass is placed on said sheet which has thus been cut, the whole being then laminated and stoved.

The sheet of synthetic material may be precut. In this case another process in accordance with the invention is one in which a line of cut along said desired outline of preopening is made in a sheet of synthetic material forming a double-faced adhesive in order to withdraw a certain width of said material, this sheet is adhesively bonded onto one of said glasses and the other glass is placed on said sheet which has thus been cut, the whole being then laminated and stored.

BRIEF DESCRIPTION OF THE DRAWINGS

Two embodiments of the invention will now be described by way of examples, no limitation being implied, with reference to the figures of the drawing attached hereto, in which.

DETAILED DESCRIPTION OF THE PREFERRED EMBODIMENTS

Figure 1:
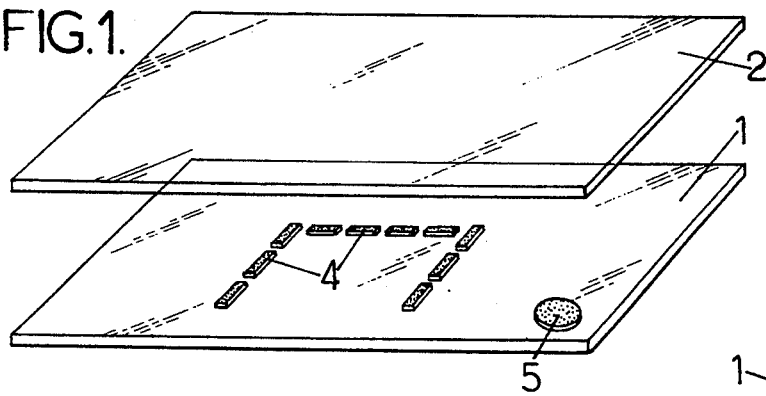
FIG. 1 shows in perspective the preparation of two glasses before production of the insert sheet of synthetic material by casting, this casting being shown in perspective in FIG. 2.
Figure 3:
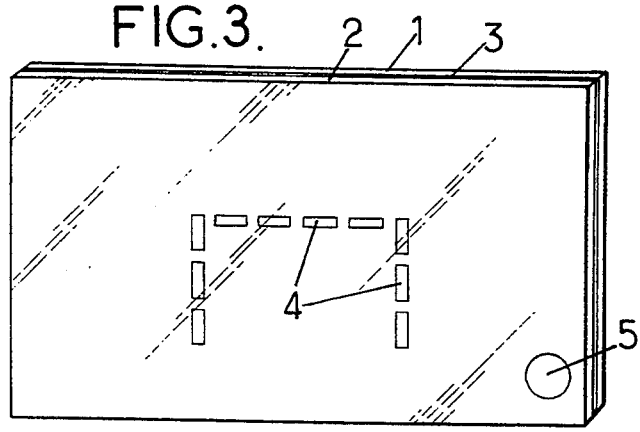
FIG. 3 shows the windowpane made of laminated glass, which is thus obtained.
Figure 2:
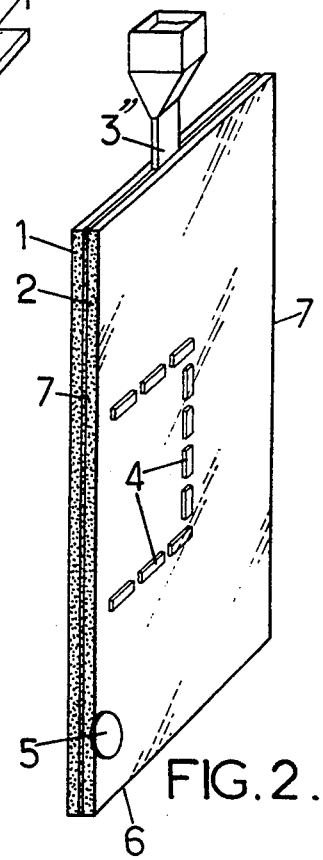

In FIGS. 1 to 3 the two glasses have been given the references 1 and 2 and the insert sheet has been given the reference 3.

Pieces of adhesive tape 4, for example made of polyethylene foam, of high adhesiveness, are adhesively bonded onto the glass 1. These pieces are arranged along what has above been called the outline of preopening, which is rectangular in the example, but which could have any other shape capable of allowing a human body to pass through. An adhesive tablet 5, possibly also made of polyethylene foam, is also adhesively bonded in one corner of the glass 1, to form the punctual region of discontinuity. The tablet 5 has the same thickness as the pieces of tape 4, for example 1.6 mm, which is a commonplace thickness in the case of the insert sheet.

With both glasses being applied against one another, with interposition of the members 4 and 5, they are placed in the vertical position of FIG. 2 and sealing is ensured at the lower 6 and side 7 edges, for example with the aid of adhesive tapes or any other means. The synthetic resin 3", for example an acrylic or similar monomer, can then be cast in the space arranged between the two glasses. Since the two glasses are strongly integrally attached by the adhesive members 4 and 5, they move away from each other only very slightly, as already mentioned above. After air bubbles have been evacuated in the upper part of the casting, polymerization of the resin can be carried out, and this makes it possible to obtain the windowpane of FIG. 3, with its inserts 4 and 5 which are embedded in the bulk of the resin 3", thus forming the insert sheet 3. The punctual region corresponding to the tablet 5 may be colored or printed, for example by silk-screen printing, in order to draw it to the travellers' attention.

Figure 5:
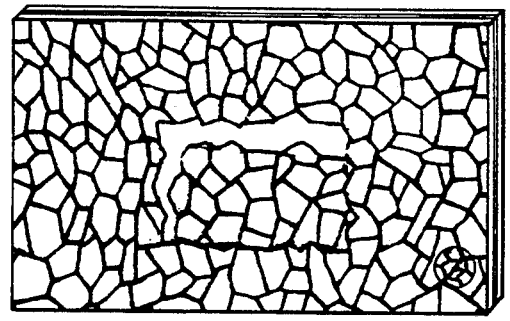
FIG. 5 shows a windowpane in accordance with the invention after breakage along the preopening line.

In case of need, the travellers can be rapidly evacuated through an opening equipped with such a windowpane. It is sufficient for them to produce the shattering of the two glasses 2 and 1 in succession (glass 2 being assumed to be the inner glass) by striking with a weight the region 5, which offers only little resistance when the first glass is broken. Next, a few strikes with a weight in the middle part, within the outline of preopening defined by the inserts 4, suffice to separate it from the remainder of the windowpane and to obtain in the latter an evacuation passage for the passengers (see FIG. 5). These operations can be performed in less than 30 seconds.

Figure 4:
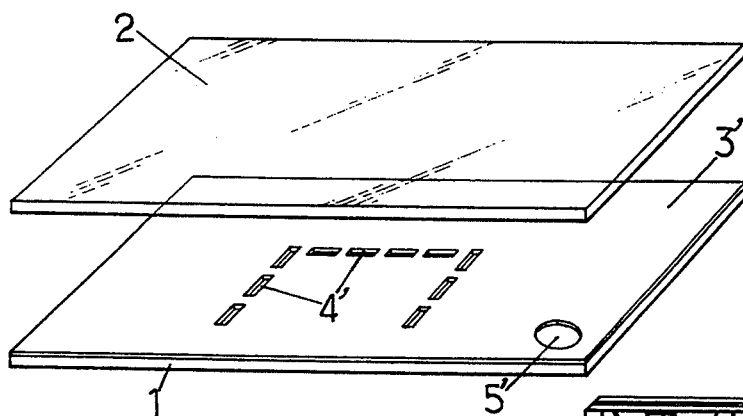
FIG. 4 shows in perspective the preparation of two glasses, with adhesive bonding, onto one of them, of an insert sheet of cut synthetic material.

FIG. 4 shows another process, in which the insert sheet 3' consists of a film which is adhesive on both its faces (for example made of PVB), applied to the glass 1, and in which cuts 4' and 5' are made and may have the same arrangements and dimensions as the members 4 and 5 in the preceding embodiment. As mentioned above, these cuts in the insert sheet 3' may be performed by any appropriate means, for example by virtue of a laser beam, before or after application onto one of the glasses. After application of the second glass, lamination and storing, a windowpane similar to that of FIG. 3 is obtained, except that the inserts 4 and 5 made of foam or similar can here be replaced by parts devoid of material, corresponding to the cuts 4' and 5'. It may be noted, however, that these voided parts or cuts in the PVB or similar sheet may also be filled with a different material of low strength, optionally colored, for example a polyethylene foam, which would avoid the risk of subsequent creep of the edges of these cuts, capable of spoiling their appearance.

The windowpane thus obtained, with or without this filling, exhibits appreciably the same characteristics as that of the preceding example, as a windowpane capable of being rapidly converted into an emergency exit in a railroad or other vehicle.

What is claimed is:

1. A laminated glass safety windowpane comprising two glass layers selected from annealed, hardened or quenched glass bonded to each other by an insert sheet of synthetic material selected from the group consisting of polyvinylbutyral and ultraviolet-polymerizable transparent acrylic resin to the opposite faces of which said glasses are adhesively attached over a complete surface thereof, in which said sheet comprises in said material a line of discontinuity in mechanical strength of relatively small width, said line defining an outline of an opening in the surface area of said insert sheet which is capable of rupturing and providing an emergency exit upon breakage of said glass layers of said window pane.

2. The windowpane as claimed in claim 1, wherein said insert sheet additionally comprises at least one punctual region of discontinuity in mechanical strength in said material located separate from said line of discontinuity, designated as region of impact for a tool, capable of facilitating the breaking of one of said glass layer through the other glass.

3. The windowpane as claimed in claim 2, wherein said line and/or region of discontinuity in said insert sheet have a hardness which is appreciably lower than that of said synthetic material of which this sheet consists.

4. The windowpane as claimed in claim 1, wherein said line of discontinuity in said synthetic material extends along the three sides of a rectangle.

5. The windowpane as claimed in claim 1, wherein said line of discontinuity in the synthetic material is an interrupted line, namely a line consisting of consecutive regions in which said synthetic material of which said sheet consists is alternately present and absent.

6. The windowpane as claimed in claim 5, in which said insert sheet of synthetic material is produced by casting and polymerization in situ between said glass layer, wherein said line of discontinuity is formed by virtue of sections of polyethylene foam tape, adhesive having high adhesiveness on both its faces so as to be adhesively bonded between said glass layer and embedded in said material of said sheet, of a thickness which is appreciably equal to that of said sheet.

7. The windowpane as claimed in claim 1, wherein said synthetic material of which the sheet consists is a transparent synthetic resin of acrylic, capable of being polymerized by the ultraviolet.

8. The windowpane as claimed in claim 1, in which said insert sheet of said synthetic material consists of a double-faced adhesive laminated between said glass layer, wherein said line of discontinuity in said material consists of a line of cut made in said sheet, along said desired outline of opening.

9. The windowpane as claimed in claim 8, wherein said synthetic material consists of a polyvinylbutyral (PVB).

10. The windowpane as claimed in claim 2, wherein said punctual region of discontinuity is devoid of any material or is occupied by a tablet of material of a strength less than that of said glass layer.

* * * * *